April 17, 1934. F. W. HACK 1,955,494
VALVE DEVICE
Filed May 9, 1929 3 Sheets-Sheet 1
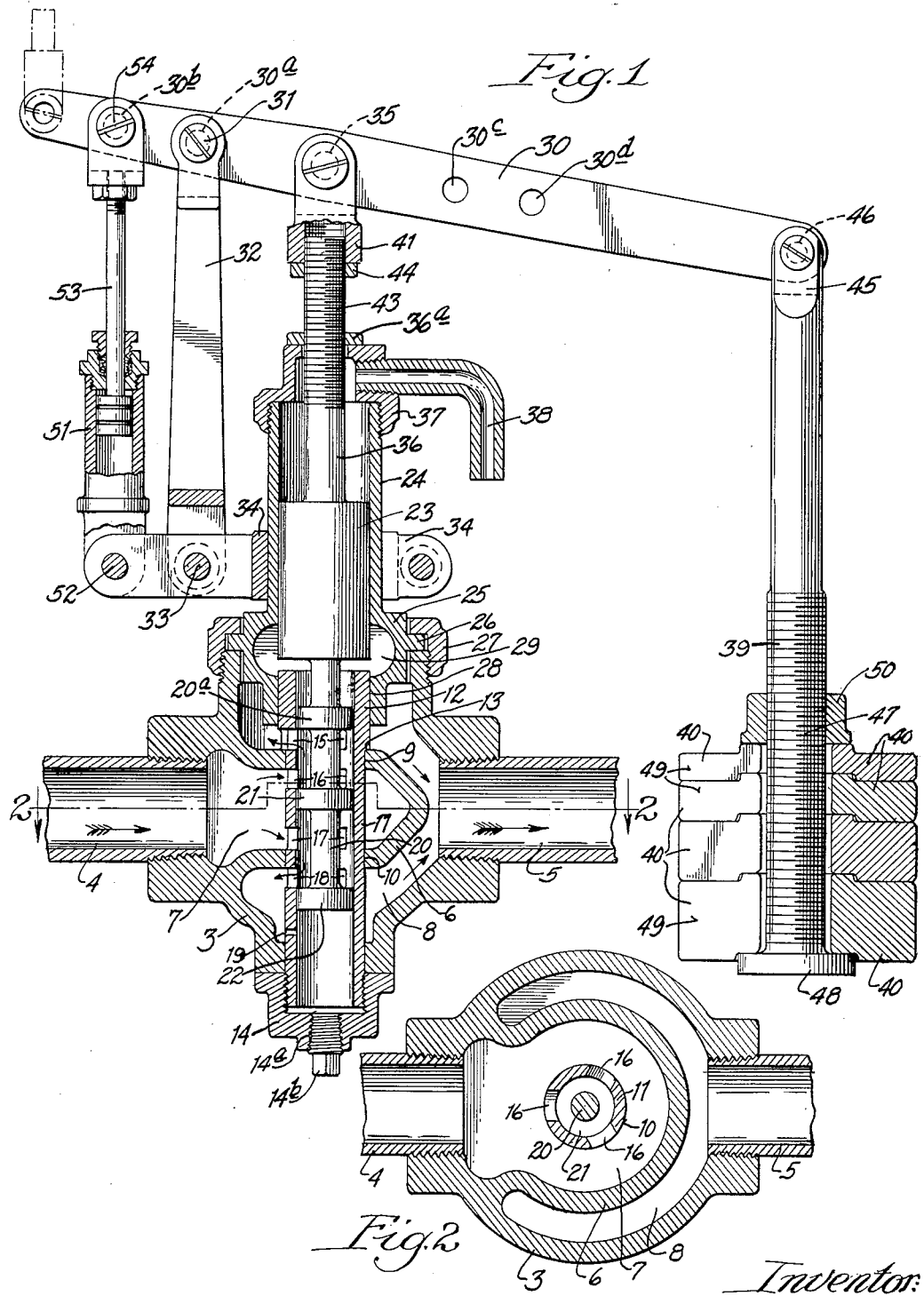

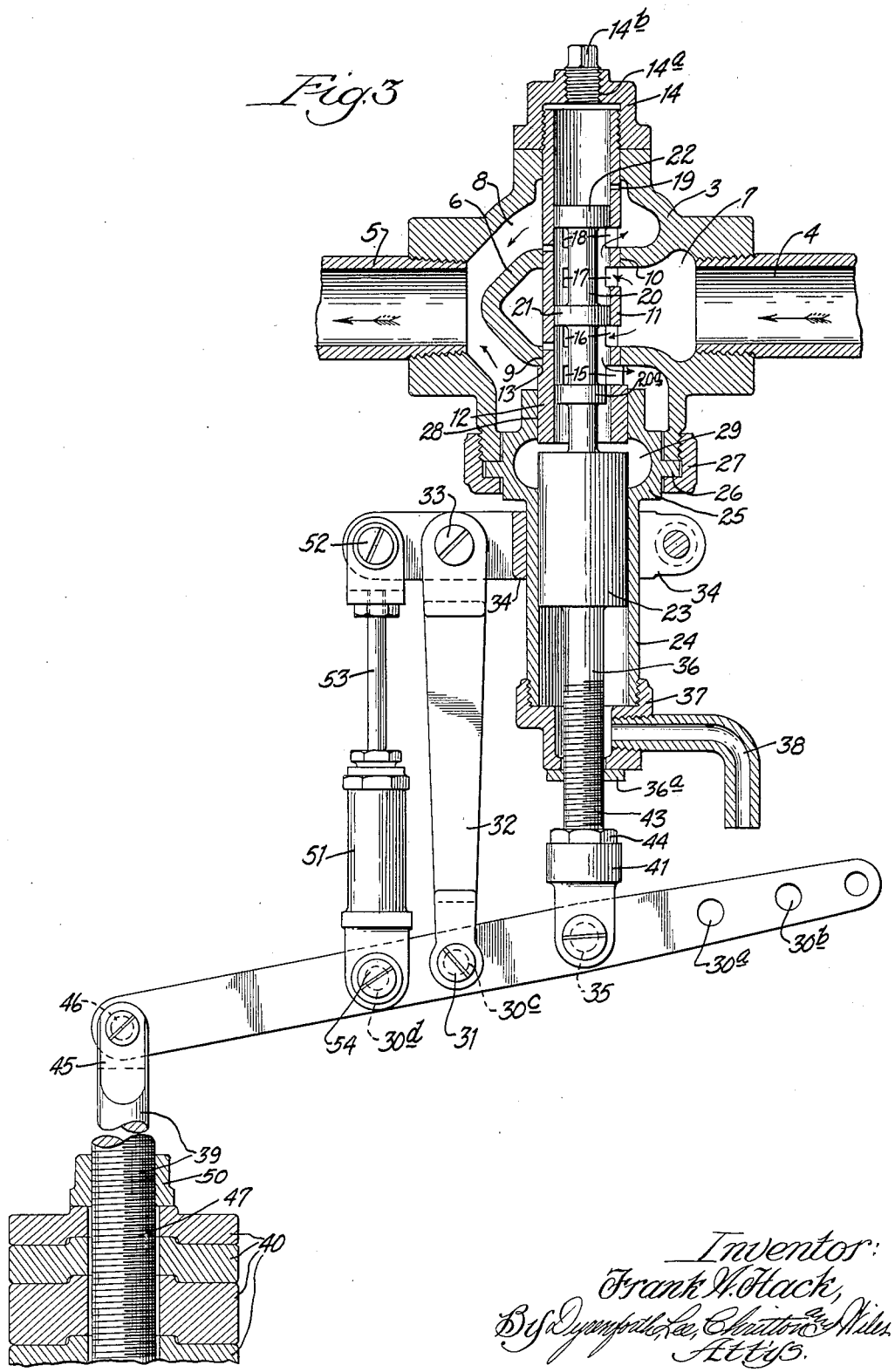

April 17, 1934.  F. W. HACK  1,955,494
VALVE DEVICE
Filed May 9, 1929  3 Sheets-Sheet 3

Inventor:
Frank W. Hack,
By Dyrenforth, Lee, Chritton & Wiles,
Attys.

Patented Apr. 17, 1934

1,955,494

UNITED STATES PATENT OFFICE 1,955,494

VALVE DEVICE

Frank W. Hack, Maywood, Ill.

Application May 9, 1929, Serial No. 361,774

12 Claims. (Cl. 50—39)

My invention relates to valve devices for controlling fluid pressure, as for example steam, air, water, or oil, and controllable by the fluid pressure within the valve device.

One of my objects is to provide a simple construction of valve device the inner mechanism of which and including the inner valve proper, and which is subject to wear and erosion, shall be readily removable from the casing of the valve device without removing the latter from the line.

Another object is to provide a valve device which will be sensitive to changes in pressure.

Another object is to provide a construction of valve device whereby leakage of pressure within it is minimized, the economic value of which is enormous.

Another object is to provide a construction of valve device which shall be practically noiseless in operation by elimination of loose joints, wings, and other features resulting in the production of noise, and wear of the valve proper will be uniform thereby prolonging the life of the structure.

Another object is to provide a valve device the inner valve proper of which shall function perfectly without danger of sticking or objectionable leakage.

Another object is to provide in a valve device comprising a lever arm weight mechanism attached to the inner valve proper and which loads the valve, for the ready adjustment of this mechanism into different positions about the vertical axis of the valve.

Another object is to provide in a valve device having a lever actuated by the valve proper and provided with a hanger for weights, for preventing disengagement of the weights from the hanger in the jarring of the structure.

Another object is to provide a valve device which shall be devoid of seat bushings which are commonly provided and the use of which involve difficulty of removal and replacement.

Another object is to provide a valve device of such construction that the tendency to chatter or pound in the line is reduced to the minimum.

Another object is to provide a valve device which will satisfactorily perform, in the regulation of pressures, at all pressures even to as low a pressure as one pound.

Another object is to provide a valve device the functioning of which will not be seriously affected by high temperatures.

Another object is to provide a valve device of the type provided for the purpose of supplying uniform pressure from a source of fluid pressure to be regulated by the valve device and the operation of which shall be automatically controlled by the outlet pressure at the valve device, whereby should the valve become fully open and the load, such as that imposed by an engine on an overloaded boiler supplied with operating pressure from the valve device, become excessive and tending to produce a vacuum in the valve device, the controlling element of the valve device will not be subjected to such vacuum, and thus the device will continue to perform the regulating function.

Another object is to provide a valve construction, whether of the inlet-pressure-regulating type or of the unloading type, adapted for the positioning of the lever-contact mechanism therefor either above or below the valve proper to adapt the valve device for use in different situations; and other objects as will be manifest from the following description.

Referring to the accompanying drawings:

Figure 1 is a view in vertical sectional elevation of a valve device constructed in accordance with my invention.

Figure 2 is a section taken at the line 2—2 on Fig. 1 and viewed in the direction of the arrow.

Figure 3 is a view like Fig. 1 showing the position of the lever-control mechanism for the valve-proper reversed relative to the position shown in Fig. 1.

Figure 4:
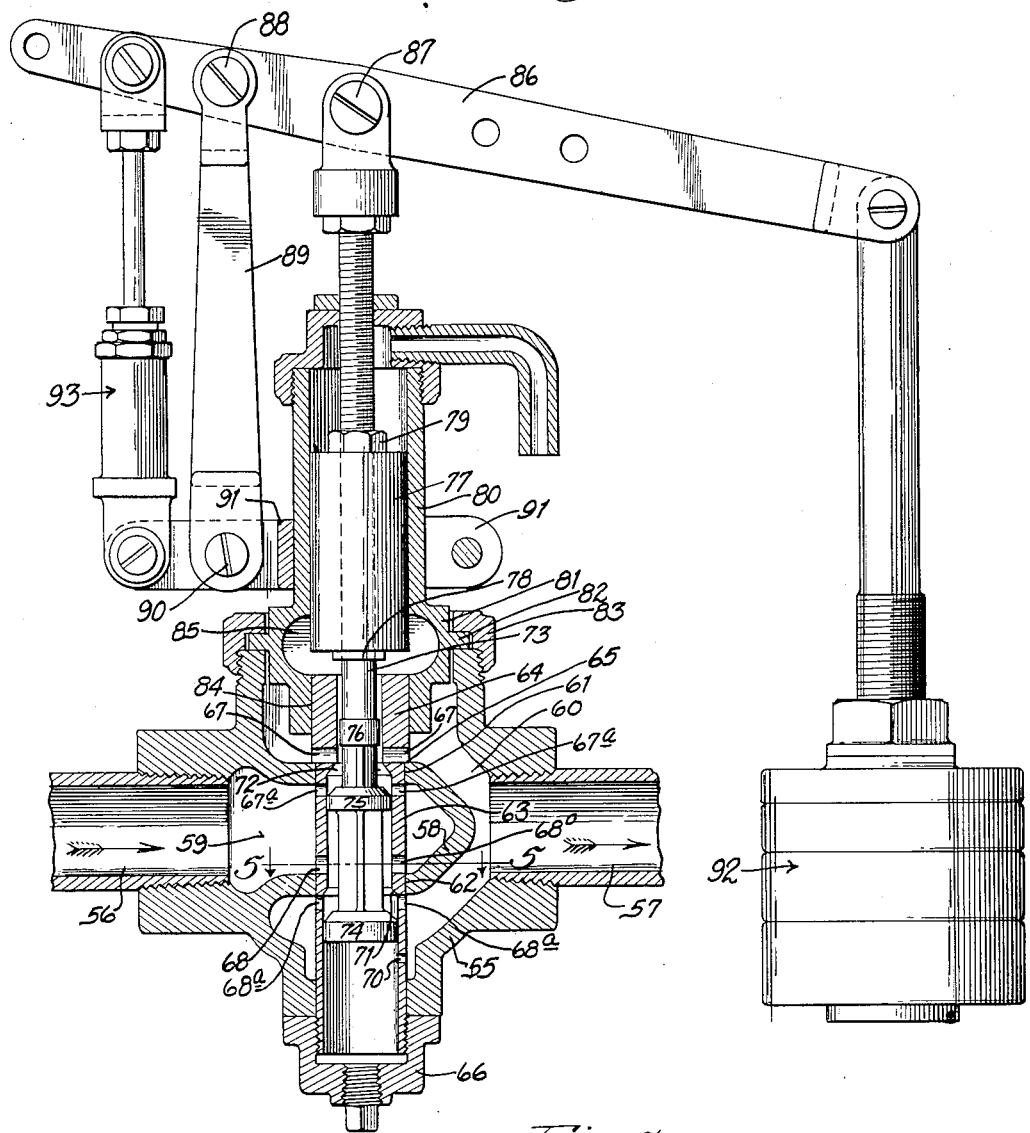
Figure 4 is a view like Fig. 1 of a modification of the structure therein shown.
Figure 5:
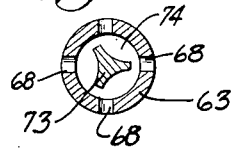
Figure 5, a section taken at the line 5—5 on Fig. 4 and viewed in the direction of the arrows.

Referring to the construction shown in Figs. 1 and 2 and treating the structure as used for regulating the outlet pressure to maintain it uniform under normal conditions, it comprises a casing 3 containing an inlet 4 for the pressure to be controlled and an outlet 5 for the reduced pressure delivered by the valve.

The casing, which may be, by way of example, an iron or brass casting, is cored to provide the hollow partition 6 which extends crosswise of the casing from the inlet 4 toward, but short of, the outlet 5, the space represented at 7 afforded within this partition, opening into the inlet 4. The space above and below the partition 6 and represented at 8 opens into the outlet 5.

The upper and lower ends of the casing 3 are open as shown, and the partition 6 is apertured as represented at 9 and 10 to receive a cylindrical sleeve 11 preferably of brass, bronze, or hardened non-corrosive steel, which is of enlarged diameter at its upper end as represented at 12 and forms a shoulder 13 which seats upon the upper portion of the partition 6. The lower end of the sleeve which is externally threaded projects below the casing 3 and has screwed thereon a cap 14, having a drain-opening 14ª closed by a plug 14ᵇ, the cap not only closing the lower end of the sleeve and casing but serving as a means of drawing the shoulder 13 on the sleeve into tight engagement with the partition.

The sleeve contains four sets of ports 15, 16, 17 and 18, and a port 19, each set comprising preferably three or more peripherally-disposed ports the centers of which are substantially 120° apart. The ports 15 are located immediately above the upper portion of the partition 6; the ports 16 and 17 immediately below and immediately above the upper and lower portions, respectively, of the partition; the ports 18 immediately below the lower portion of the partition; and the port 19, which is preferably of relatively small cross-sectional area, below the ports 18.

The inner valve proper and piston of the device are provided, in the structure shown, as an integral structure, preferably of brass, bronze, or hardened non-corrosive steel, reciprocably mounted in the sleeve 11, the valve proper comprising a stem portion 20 formed with a pair of valve-disk portions 21 and 22 so spaced that when the valve and piston device are in the position shown in Fig. 1 the valve 21 will extend at its upper surface flush with the lower edges of the ports 16 and the valve 22 at its upper portion flush with the lower edges of the ports 18 and wholly above the port 19.

The piston referred to and represented at 23 is on the upper end of the stem 20 and slidingly fits in the upper cylinder-portion 24 of a hollow member 25 provided adjacent its lower end with an annular peripheral flange 26 seating upon the upper, open, end of the casing 3, the member 25 being tightly secured to the casing by a gland 27 screwed upon the threaded end of the casing and against the flange 26. As will be noted from Fig. 1. the lower end of the cylinder portion 24 loosely fits the valve casing and gland 27 adapting the portion 24 to be laterally shifted on the casing to insure the proper alinement of the sleeve and cylinder.

The hollow member presents at its lower end, at which it extends into the casing 3, a vertically extending bore 28 which may be, if desired, and as shown, of the same diameter as that of the bore of the cylinder 24 and in vertical alinement therewith and with the sleeve 11 which closely fits, at its upper end-portion 12, into the bore 28, the space within the member 25 between the cylinder 24 and the bore 28 being expanded to form an annular chamber 29 opening into the upper end of the sleeve 12.

The stem 20 is also provided with a piston-disk 20ª located in the sleeve 11 and in the position of the parts shown in Fig. 1 extending immediately above the ports 15, this disk being provided to partially restrict or throttle the communication between chamber 8 and chamber 29. The throttling effect is preferably obtained by making the disk 20ª of an external diameter slightly less, say by about 1/64 of an inch, than the internal diameter of the sleeve 12 to provide a clearance between the disk and sleeve.

As in the case of the common forms of reciprocating-valve devices of the type to which this invention relates, the piston 23 is weighted to a degree depending on the pressure desired to be produced at the outlet of the regulator. The weighting of the particular construction shown is provided for by providing a lever 30 pivoted near one end on a link 32 by a pivot-pin 31 extending through an opening 30ª in the lever 30, the link 32 being pivotally supported at its lower end, as represented at 33, on a stud extending laterally from a clamp 34 secured in encircling position on the cylinder 24. The lever 30 is pivoted at 35 to the upper end of an upwardly projecting rod-extension 36 of the piston 23 which extends upwardly through a cap-nut 37 screwed upon the upper open end of the casing 3 and has a vent-pipe 38 opening into the cylinder 24 above the piston 23. The other end of the lever 30 carries a weight-hanger represented at 39 for supporting weights 40.

The connection of the lever 30 with the rod-extension 36 is preferably by means of a head 41 which screws upon the upper, threaded, end 43 of the stem 36 to be adjustable up and down thereon and held in place by a lock-nut 44, the upper end of the head 41 being slotted to provide ears between which the lever 30 extends, and in which the pivoting-pin 35 is mounted; the stem below the nut 44 having a lock-nut 36ª forming a stop limiting the descent of the combined piston and valve structure.

The weight-hanger is shown as in the form of a rod having a clevis-portion 45 at its upper end at which it is pivotally connected, as represented at 46, to the outer end of the lever 30, its lower end being threaded, as represented at 47 and expanded at its lowermost portion as represented at 48. The weights which are radially slotted at 49 to receive the rod forming the hanger are supported in superposed position, as shown, on the head 48 and are clamped in place, to prevent them from being jarred from the hanger, by a nut 50 engaging the threaded portion 47 of the rod.

In the operation of the device as an outlet-pressure regulator the fluid under varying pressures to be discharged through the outlet of the device at a uniform pressure, passes through the ports 16 and 17 into the sleeve 12 and assuming the valve to be in the position shown discharges through the ports 15 and 18 into the chamber 8 the fluid also entering the sleeve through the port 19, whereby the pressure on the valve is balanced and the fluid flows to outlet 5.

The pressure of the fluid in the sleeve is also directed against the underside of piston 23 and valve disk 22, the rising of which is resisted by the load imposed thereon by the weighted lever mechanism, the latter being weighted sufficiently to ensure the maintaining of the desired pressure of the fluid at the outlet.

Rise in pressure at the outlet reacts against the underside of the piston 23 and valve disk 22 causing the lifting of the valve-portions 21 and 22 to throttling position for reducing the flow of fluid to the outlet 5 and maintaining substantially uniform pressure at the latter. When the pressure at the outlet drops slightly the load on the piston and disk 22 forces the combined piston and valve structure downwardly and the valve opens to control the flow of fluid to the outlet for restoring the pressure at the latter, it being understood that the valve by being balanced is rendered very sensitive in operation.

The ports 15 and 18 are preferably of substantially the same effective cross-sectional area as the ports 16 and 17 whereby the inlets to the chamber 8 are restricted and as the space below the piston 23 is in communication with the fluid pressure passing through the valve device, at a point in advance of the ports 15, a throttling effect, enhanced by the provision of the throttling disk 20ᵉ, is produced with the result that change in pressure of the fluid acting against the piston 23 is relatively slow compared with structures wherein no throttling of the passage leading to the piston is provided for, and likewise the provision of the small orifice 19 serves to retard the exertion of pressure against the underside of valve-disk 22, this being an advantage as it serves, by the somewhat sluggish response of the piston and valve structure to pressure impulses, to prevent objectionable violent movement of the piston 20ᵃ under variations in pressure between the inlet and outlet, and prevents failure of the device to maintain a substantially uniform pressure at the outlet even should vacuum be produced in the chamber 8 as sometimes happens as, for example, when the valve is fully open and the load, such as that imposed by an engine supplied with operating pressure from the valve, is excessive.

Abrupt closing of the inlet-ports of the sleeve 12 is objectionable and to avoid such action I provide relatively small-area passages between the chamber 7 and ports 15 and between the ports 17 and the chamber 7, which are so located, as shown, that these ports and chambers continue in communication, though constrictively, following the closing of the relatively large-area ports 16 and 18 in the movement of the valve to closed position.

The port 19 is provided to retard the movement of the valve proper in both directions and thereby stabilize the valve in service.

As is customary in pressure regulators of the piston type I provide my improved valve device with a dash-pot represented at 51 which is pivotally connected at its cylinder, as represented at 52, with the outer end of the clamp 34 and at the upper end of its piston-stem 53 with the lever 30 by a pivoting pin 54 extending through an opening 30ᵇ in the lever 30.

Under some conditions it is undesirable, if not impossible, because of overhead obstructions adjacent the pipe line, to mount the lever-mechanism controlling the valve-proper, above the latter, and to adapt this mechanism to be mounted below, I provide the lever with two extra apertures 30ᶜ and 30ᵈ corresponding with the apertures 30ᵃ and 30ᵇ, respectively, and dispose the parts of the structure as shown in Fig. 3, in which position the dash-pot mechanism is turned end-for-end, and pivoted at the opening 30ᵈ to the lever 30 and the link 32 connects with the lever 30 at 30ᶜ, the similar clevis-ends of the dash-pot mechanism adapting it to be pivotally connected at either end with the lever 30 and clamp 34.

While I have illustrated the valve device with its parts positioned to operate as a means controlling the outlet pressure and have described it above as so operating, the device may be used to great advantage as a so-called unloading valve to regulate the pressure at the valve inlet merely by connecting the pipe in which the pressure is to be regulated, to the portion of the valve-device described above as its outlet, viz., the opening in the valve-casing which opens directly into the chamber 8, and adjusting the nut 36ᵃ to a position in which the valve-disks 21 and 22 normally close ports 16 to ports 15 and ports 18 to ports 17. Thus when the pressure in chamber 8 exceeds that desired the piston is lifted by the increased fluid pressure and with it the valve proper which opens the chamber 8 to the ports 16 and 17 permitting of the escape of such excess pressure. Such reconditioning of the parts as just described applies to the valve-device of either Figs. 1 and 3.

In Fig. 4, I have shown my invention as embodied in a valve device of a type wherein the valves cooperate with seats. In this construction, provided for regulating the outlet pressure to maintain it uniform under normal conditions, the casing of the valve structure is represented at 55 and contains an inlet 56 for the pressure to be controlled and an outlet 57 for the reduced pressures delivered by the valve.

The casing 55 is cored to provide the hollow partition 58, corresponding with the partition 6 of Fig. 1, the space afforded by this partition being represented at 59 and communicating with the inlet 56. The space above the hollow partition 58 and represented at 60 opens into the outlet 57. The upper end of the casing 55 is open as shown and the partition 58 is apertured as represented at 61 and 62 to receive a cylindrical sleeve 63 preferably of brass, bronze or hardened non-corrosive steel which is of enlarged diameter at its upper end as represented at 64 and forms a shoulder 65 which seats upon the upper portion of the partition 58. The lower end of the sleeve 63 is externally threaded and projects below the lower end of the casing 55 and has screwed thereon a cap 66.

The sleeve 63 contains four sets of ports 67, 67ᵃ, 68, and 68ᵃ, and a single port 70. The ports 67 are located immediately above the upper portion of the partition 58 and open into the chamber 60; the ports 67ᵃ are located at the top of the chamber 60; the ports 68 at the bottom of this chamber; the ports 68ᵃ are located immediately beneath the lower portion of the partition 58 and open into the chamber 60; and the port 70, located below the port 68ᵃ, opens into the chamber 60.

The inner surface of the sleeve 63 is so shaped as shown as to provide a downwardly-facing annular, preferably beveled, seat 71 immediately above the ports 68ᵃ and with a downwardly facing, preferably beveled, seat 72 of smaller diameter than the seat 71 and located immediately below the ports 67.

The inner valve proper and piston of the device are provided, in the structure shown, as an integral structure preferably of brass, bronze, or hardened non-corrosive steel, reciprocably mounted in the sleeve 63, the valve proper comprising a stem portion 73 equipped with valve disk portions 74 and 75 vertically spaced apart and having sliding fit in the lower end of the sleeve, these valve disk portions cooperating, respectively, with the seats 71 and 72. The stem 73 is also provided with a disk portion 76 spaced from the surrounding wall of the sleeve 63.

The piston referred to and represented at 77 is on the upper end of the stem 73, being shown as formed separately from the stem and rigidly held in place thereon against a collar 78 on the stem, by a nut 79 threaded on the upper end of the stem. The piston 77 slidingly fits in the upper cylinder portion 80 of a hollow member 81 provided adjacent its lower end with an annular peripheral flange 82 seating upon the upper, open, end of the casing 55, the member 81 being tightly secured to the casing by a gland 83 screwed upon the threaded end of the casing and against the flange 82.

The hollow member 81 presents at its lower end, at which it extends into the casing 55, a vertically extending bore 84 which may, if desired and as shown, be of the same diameter as the bore of the cylinder 80 and in vertical alinement therewith and with the sleeve 63 which closely fits, at its upper end portion 64, into the bore 84, the space within the member 81 being expanded to form an annular chamber 85 opening into the upper end of the sleeve 63.

The disk portion 76 is provided to produce a throttling effect as explained of the disk 30 of the preceding figures.

The piston is weighted as explained of the construction of the preceding figures, the lever of this mechanism being represented at 86, it being pivotally connected at 87 with the upper end of the piston stem and fulcrumed at 88 on the upper end of a link 89 pivoted at its lower end, as indicated at 90, to a clamp 91, corresponding with the clamp 34, and mounted on the cylinder 80. One end of the lever 86 is weighted as indicated at 92 and its opposite end is pivotally connected with dash-pot mechanism represented at 93 and pivotally supported on the clamp 91.

In the operation of the device shown as conditioned for regulating the pressure at the outlet 57, the fluid under varying pressures to be discharged through the outlet 57 at a uniform pressure, passes through the ports 67a and 68 into the sleeve 63 and assuming the valve to be in the position shown in Fig. 4 discharges through the ports 67 and 68a into the chamber 60, the fluid flowing to the outlet 57.

The pressure of the fluid in the sleeve is directed against the underside of the piston 77 and the valve disk 74 the rising of which is resisted by the load imposed thereon by the weighted lever mechanism.

Rise in pressure at the outlet 57 reacts against the underside of the piston 77 and valve disk 74 causing the lifting of the valve portions 74 and 75 to throttling position for reducing the flow of fluid to the outlet 57 and maintaining substantially uniform pressure at the latter. When the pressure at the outlet drops slightly the load on the piston and disk 74 forces the combined piston and valve structure downwardly and the valve opens to control the flow of fluid to the outlet for restoring the pressure at the latter.

The port 70 is provided for the purpose as explained of port 19 of the preceding figures.

As in the case of the construction shown in Fig. 1, the parts of the structure shown in Fig. 4 may be so arranged, if desired, that the lever mechanism will extend below the valve instead of above it, as shown in Fig. 4. This is effected by turning the entire valve structure upside down; turning the dash-pot mechanism end-for-end as in the case of the dash-pot mechanism of Fig. 3 and shifting the pin connections between the lever 86 and the link support 89 and dash-pot mechanism 93 to the two apertures in the lever 86 shown at the right-hand of Fig. 4, it being understood that the weight-hanger would depend from the lever as shown of the construction in Fig. 3.

It will be noted that in the particular construction shown the valve-disks 74 and 75 in moving to closed position not only shut off the flow of fluid through the seats with which they co-operate but also close the ports 67a and 68a thereby producing tight closure and preventing wire-drawing.

By providing the removable sleeve and piston valve operating therein, a simple construction is provided, permitting of the ready removal of those parts of the device which are subjected to the greatest wear and erosion in use, without removing the device from the line, these parts being removable through an end of the casing upon removing the cap-members at opposite ends of the device. Furthermore, the disposition of the ports of each set thereof in the sleeve affords plural-point bearings in the plane of each set of ports, around the valve, with the manifest advantage.

Another advantage arising from the constructing of a valve in acordance with my invention is that the sleeve and valve, being of the same material, may be acurately fitted, without clearance to compensate for unequal expansion, to permit of the desired freedom of movement of the valve without leakage regardless of the temperature of these parts in the operation of the valve-device, and while the sleeve expands to a greater extent, for any given temperature change, then the casing in which it is located, the initial fit of the sleeve in the casing may be substantially fluid-pressure tight, but not mechanically tight, as expansion of the sleeve binding it more tightly in the casing is not objectionable.

Furthermore, as the pressure against the valve is equally distributed about its periphery slapping of the valve with resultant noise and localized wear is avoided, the wear of the valve being distributed about its periphery.

The provision of the piston and inner valve as a unitary structure avoiding loose, or flexible connections, is of advantage as thereby noise in the operation of the device is avoided.

The provision of the cylinder 24 and cylindrical housing-portion 28 for the sleeve 12, in the one construction and of the cylinder 80 and cylindrical housing portion 84 for the sleeve 64 in the other construction, is of advantage as it ensures the perfect automatic alinement of the sleeves and cylinders making for smoothness of operation of the valves and pistons and minimizing wear of the parts.

The provision of the clamps 34 and 91 combined with the rotatability of the combined piston and valve structures about the axes of the valves, permits of the adjustment of the valve-controlling levers 30 and into any desired position about the axes of the valves to adapt the structures for use in different situations. Such adjustment may also be effected by loosening the members 27 and 73 and rotating the cylinders 24 and 80 with the parts carried thereby, respectively.

While I have illustrated and described a particular construction of device embodying my invention, I do not wish to be understood as intending to limit it thereto as the same may be variously modified and altered without departing from the spirit of my invention.

What I claim as new, and desire to secure by Letters Patent, is:

1. A valve device comprising, in combination, a casing containing an inlet and an outlet, a sleeve in said casing containing ports in communication with said inlet and outlet, a valve reciprocable in said sleeve and controlling said ports, a member connected with said casing and containing a bore into one end of which said sleeve extends and closely fits, and a piston operatively connected with said valve and reciprocable in the other end of said bore.

2. A valve device comprising, in combination, a casing containing an inlet and an outlet, a sleeve in said casing containing ports in communication with said inlet and outlet, a valve reciprocable in said sleeve and controlling said ports, a member connected with said casing and containing a bore into one end of which said sleeve extends, and a piston operatively connected with said valve and reciprocable in the other end of said bore, said member being adapted to be shifted laterally relative to said casing for alinement thereof with said sleeve.

3. A valve device comprising, in combination, a casing containing an inlet and an outlet, a hollow partition in said casing with its interior open to said inlet, a sleeve in said casing extending through said partition and containing ports communicating with said outlet above and below said partition and ports at different points along said sleeve communicating with the space in said partition, a valve reciprocable in said sleeve and having disk portions which, in the open condition of the valve-device, extend, respectively, between one of the ports communicating with said outlet and the adjacent port opening into the space in said partition and between the other ports opening into said outlet, whereby the valve is balanced, and fluid-pressure means controlling the position of said valve.

4. In a device having a member which is weighted by separate weights and is subjected in operation to jarring action, the combination of a rod having a head at its lower end forming a seat for the weights applied to the rod laterally and threaded above said head and weights, and a nut engaging the threaded portion of said rod for clamping said weights to said seat.

5. A valve device comprising a casing having an inlet and an outlet, a valve reciprocable in said casing and controlling the flow of fluid therethrough and fluid-pressure means controlling the position of said valve, a cylinder relatively adjustable on said casing, a piston reciprocable in said cylinder and subjected to the fluid pressure, a lever, a support for said lever carried by said cylinder, means loading said lever, and means operatively connecting said lever with said valve.

6. A valve device comprising, in combination, a casing containing an inlet and an outlet, a sleeve containing inlet and outlet ports communicating with the inlet and outlet of said casing, a valve movable in said sleeve and controlling said ports, and means for controlling the position of said valve responsive to the pressure of fluid at said outlet, said means opening into the passage in said sleeve between the inlet and outlet ports of the latter, said sleeve outlet port forming a constriction the effective cross-sectional area of which is substantially no greater than the effective cross-sectional area of said sleeve inlet port.

7. A valve device comprising a casing having an inlet and an outlet, a valve in said casing controlling the flow of fluid therethrough, fluid-pressure means controlling the position of said valve comprising a support, a lever pivoted on said support and operatively engaging said valve and cushioning means for said lever, the parts being so constructed that by arranging them in one position relative to each other said lever may be caused to assume valve-controlling position at the top of the device and said cushioning means be positioned to cushion said lever and by arranging them in another position said lever may be caused to assume valve-controlling position at the bottom of the device with the cushioning means positioned to cushion the lever, as desired.

8. A valve device comprising a casing having an inlet and an outlet, a valve in said casing controlling the flow of fluid therethrough and fluid-pressure means controlling the position of said valve comprising a lever, a support for said lever, a cushioning device operatively engaged by said lever, and means adapting said cushioning device and said support to be operatively engaged with said lever at either side of the point of engagement of said lever with said valve, for the purpose set forth.

9. A valve device comprising a casing having an inlet and an outlet, a valve in said casing controlling the flow of fluid therethrough and fluid-pressure means controlling the position of said valve comprising a lever, a support for said lever and a cushioning device operatively engaged by said lever and adapted for connection at either end with said lever.

10. A valve device comprising a casing having an inlet and an outlet, a valve in said casing controlling the flow of fluid therethrough and fluid-pressure means controlling the position of said valve comprising a pivotally-supported lever, a support and a cushioning device engaging said lever and support and adapted for connection with said lever and support when said cushioning device is turned end for end.

11. A valve device comprising, in combination, a casing containing an inlet and outlet, a sleeve in said casing and containing ports in communication with said inlet and outlet, a valve reciprocable in said sleeve and controlling said ports, and means controlling the position of said valve responsive to the pressure of the fluid at said outlet comprising an element actuated by the fluid and subjected to the pressure of the fluid at said outlet, the fluid in passing to said element passing through said sleeve, and a throttling element for said passage movable in said sleeve with said valve.

12. A valve device comprising, in combination, a casing containing an inlet and an outlet, a hollow partition in said casing with its interior open to said inlet, a sleeve in said casing extending through said partition and containing ports communicating with said outlet above and below said partition and ports at different points along said sleeve communicating with the space in said partition, a valve reciprocable in said sleeve and having disk portions which, in the open condition of the valve-device, extend, respectively, between one of the ports communicating with said outlet and the adjacent port opening into the space in said partition and between the other ports opening into said outlet, whereby the valve is balanced, fluid-pressure means controlling the position of said valve, said sleeve being closed at one end and a disk movable with said valve between said ports and the closed end of said sleeve, said sleeve containing a small opening between said disk and said closed end and opening to said outlet.

FRANK W. HACK.